Dec. 13, 1966    T. D. WHITENACK, JR    3,290,710
LIP-OPERATED SWITCHING DEVICE FOR
POWER OPERATED LOADING PLATFORM
Filed Nov. 17, 1964    5 Sheets-Sheet 1
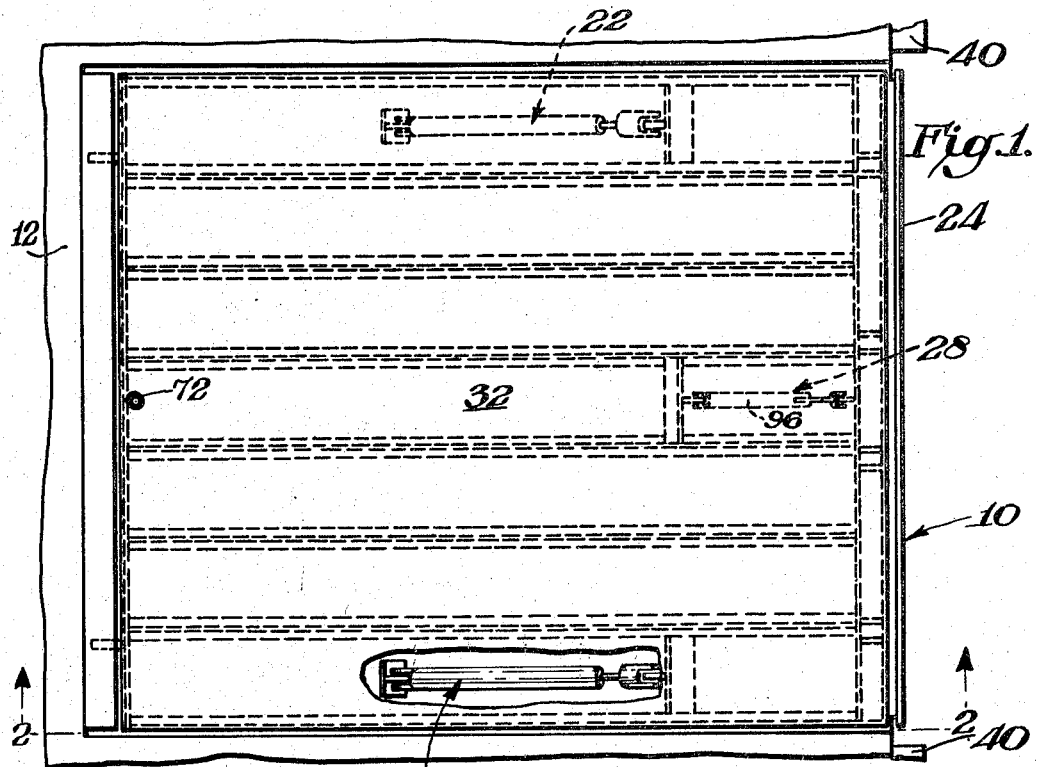
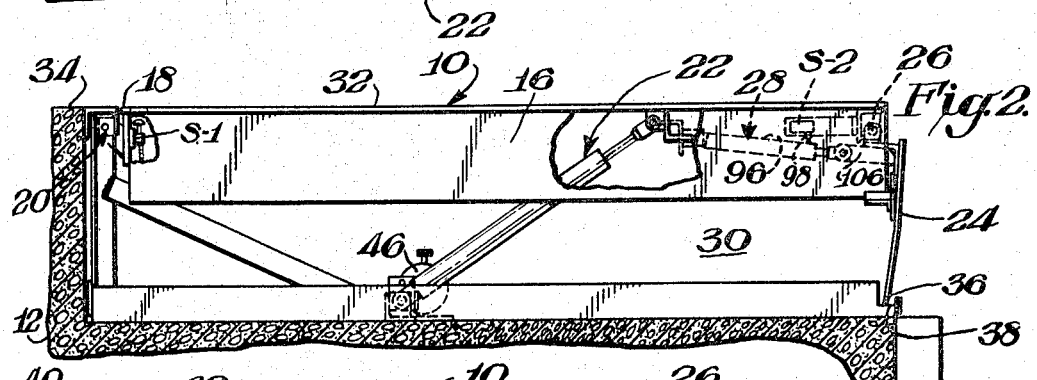
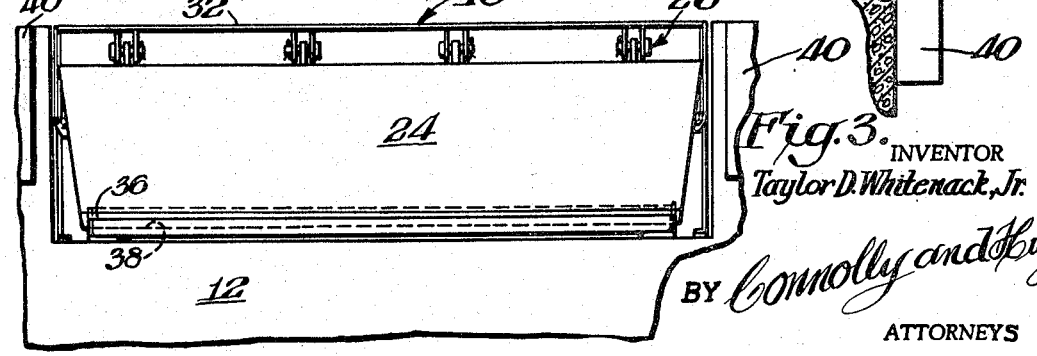
INVENTOR
Taylor D. Whitenack, Jr.
BY Connolly and Hutz
ATTORNEYS

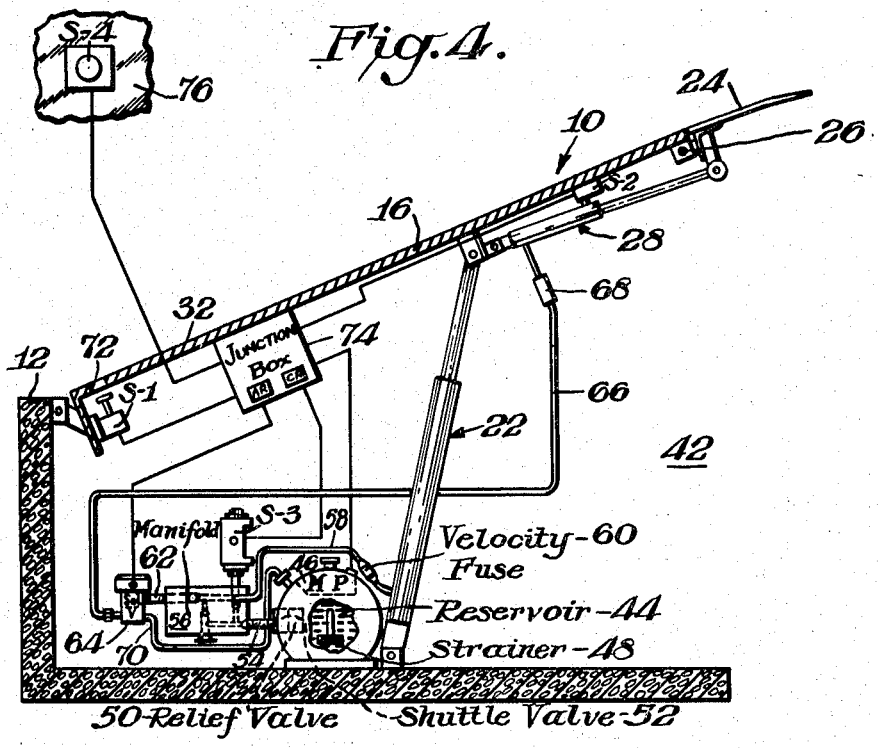
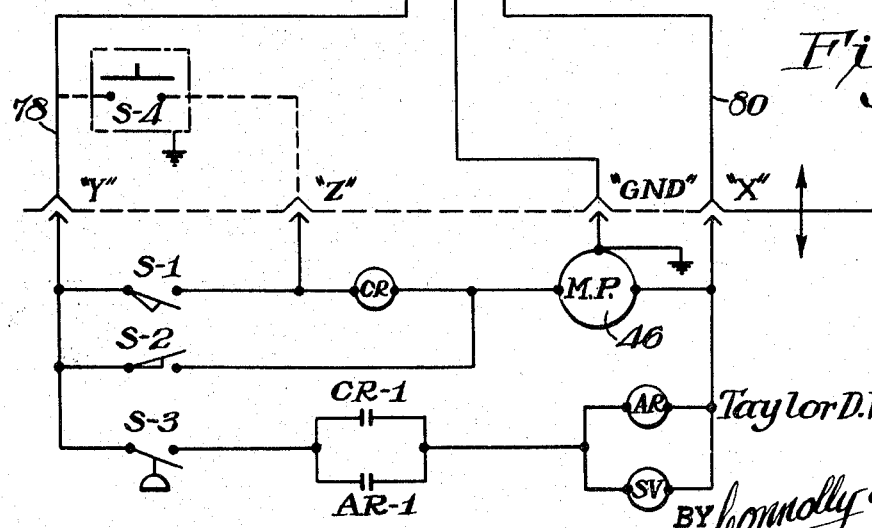

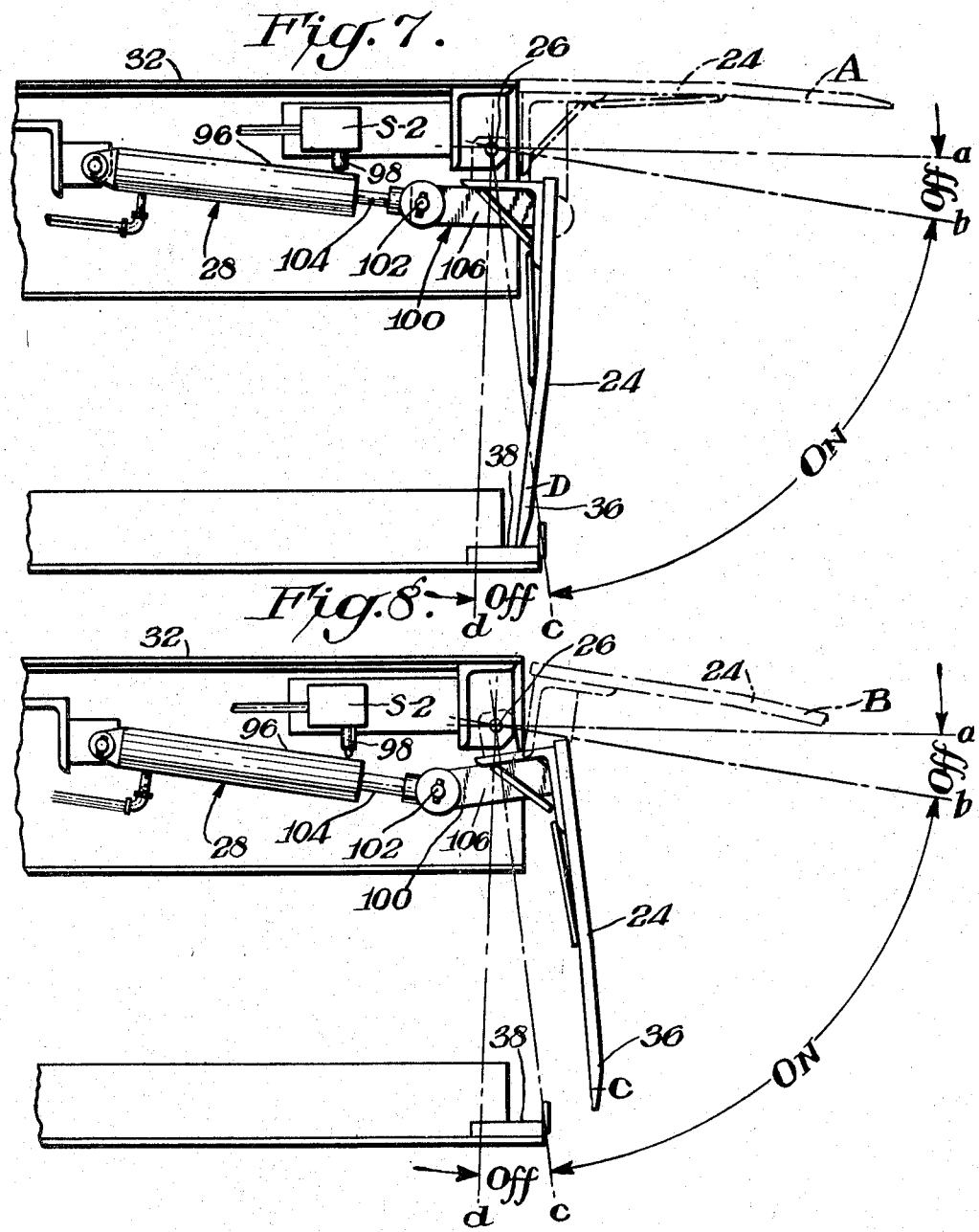

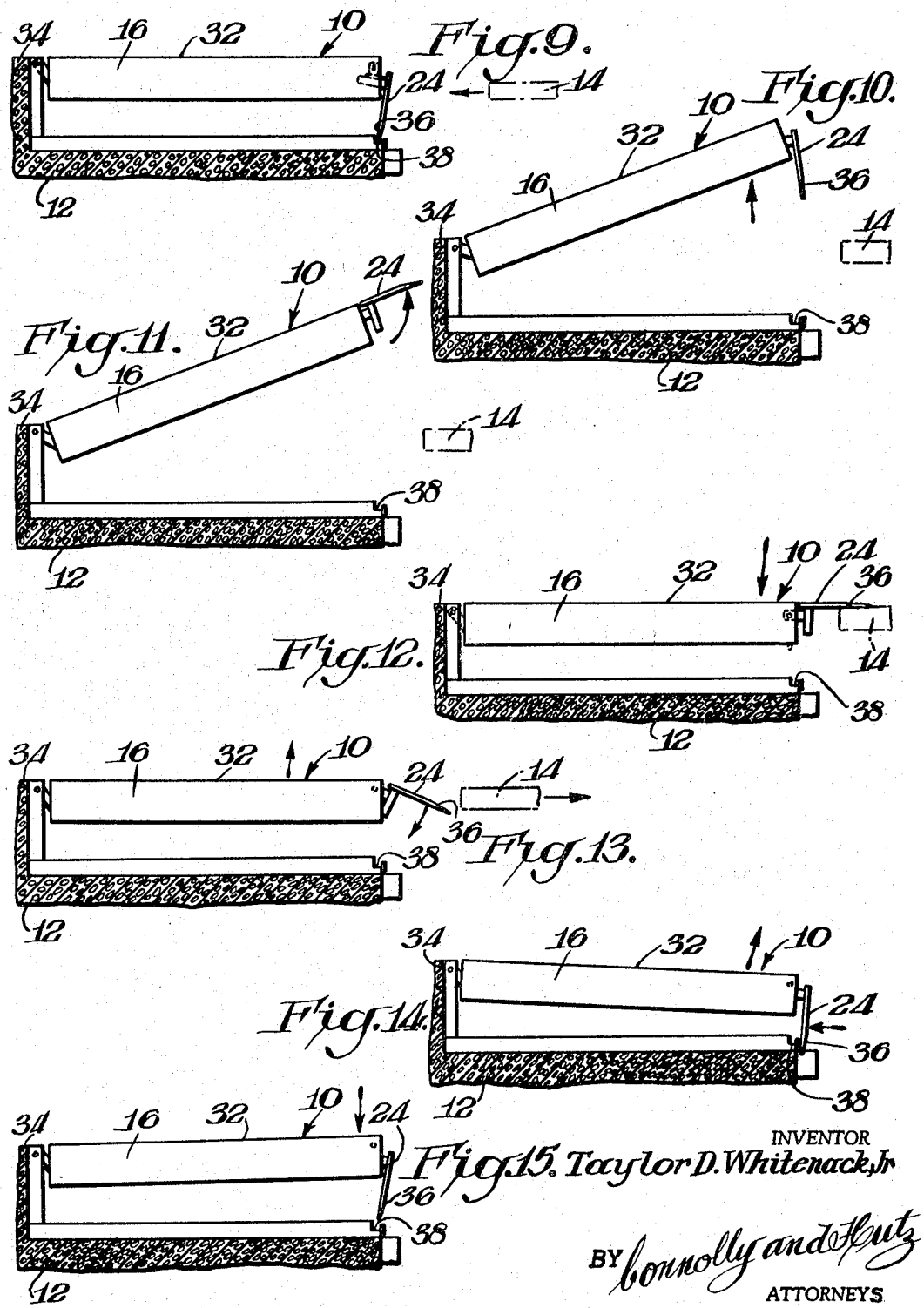

United States Patent Office 3,290,710
Patented Dec. 13, 1966

3,290,710
LIP-OPERATED SWITCHING DEVICE FOR POWER OPERATED LOADING PLATFORM
Taylor D. Whitenack, Jr., Fort Wayne, Ind., assignor to Symington Wayne Corporation, Salisbury, Md., a corporation of Maryland
Filed Nov. 17, 1964, Ser. No. 411,930
4 Claims. (Cl. 14—71)

This invention relates to a lip-operated switching device for a power-operated loading dock board, and it more particularly relates to such a device for an automatic lip.

Power operated ramps or dock boards are used for bridging the space between a loading platform and the bed of a vehicle parked adjacent it. Some of these ramps have a hinged lip that stands in a vertical retracted position while the main platform of the ramp lies horizontally flush with the loading dock to permit traffic along the dock to freely cross over it from side to side. The lip is raised to a bridging position to form a continuation of the ramp when it is elevated over and dropped upon an adjacent truck bed. When the truck drives away from under the lip, the ramp falls and the lips drops to the vertical retracted position. Copending commonly assigned patent application S.N. 237,691, filed November 14, 1962, now U.S. Patent 3,255,478, issued June 14, 1966, describes a multi-part, lip-operated linkage that actuates a switch to raise the ramp as the lip drops to the crossover position when it is left unsupported by removal of a truck from under it.

An object of the invention is to provide a particularly simple, economical, efficient and dependable lip-operated switching device for a power transported platform such as a loading dock ramp.

In accordance with this invention the lip-operated switch is mounted under the platform with an operating stem disposed toward the operating cylinder for the lip. The cylinder is connected to the lip in a manner that causes it to assume the same angle relative to the platform when the lip is in its retracted and bridging positions and different angles in other lip positions. The switch is accordingly energized only when the lip is in between the retracted and bridging positions without requiring any parts in addition to those needed for actuating movement of the lip. In a particularly advantageous form of this arrangement the cylinder contacts the stem in its closest position relative to the platform when the lip is in its retracted and bridging positions to then maintain the ramp raising motor inoperative.

Novel features and advantages of the present invention will become apparent to one skilled in the art from a reading of the following description in conjunction with the accompanying drawings wherein similar reference characters refer to similar parts and in which:

FIG. 1 is a top plan view of a ramp upon which one embodiment of this invention is mounted;

FIG. 2 is a cross-sectional view in elevation taken through FIG. 1 along the line 2—2.

FIG. 3 is a front view in elevation of the ramp shown in FIGS. 1 and 2;

FIG. 4 is a diagrammatic cross-sectional view in operation of the ramp shown in FIGS. 1-3 in a raised position;

FIG. 5 is a schematic diagram of the electrical system of the ramp shown in FIGS. 1-4;

FIG. 7 is a partial view in elevation of the lip and adjacent portions of the ramp shown in FIGS. 1-4 showing the vertical retracted position of the lip in full outline and the raised bridging position of the lip in phantom outline in conjunction with an embodiment of this invention and its operating diagram;

Figure 6:
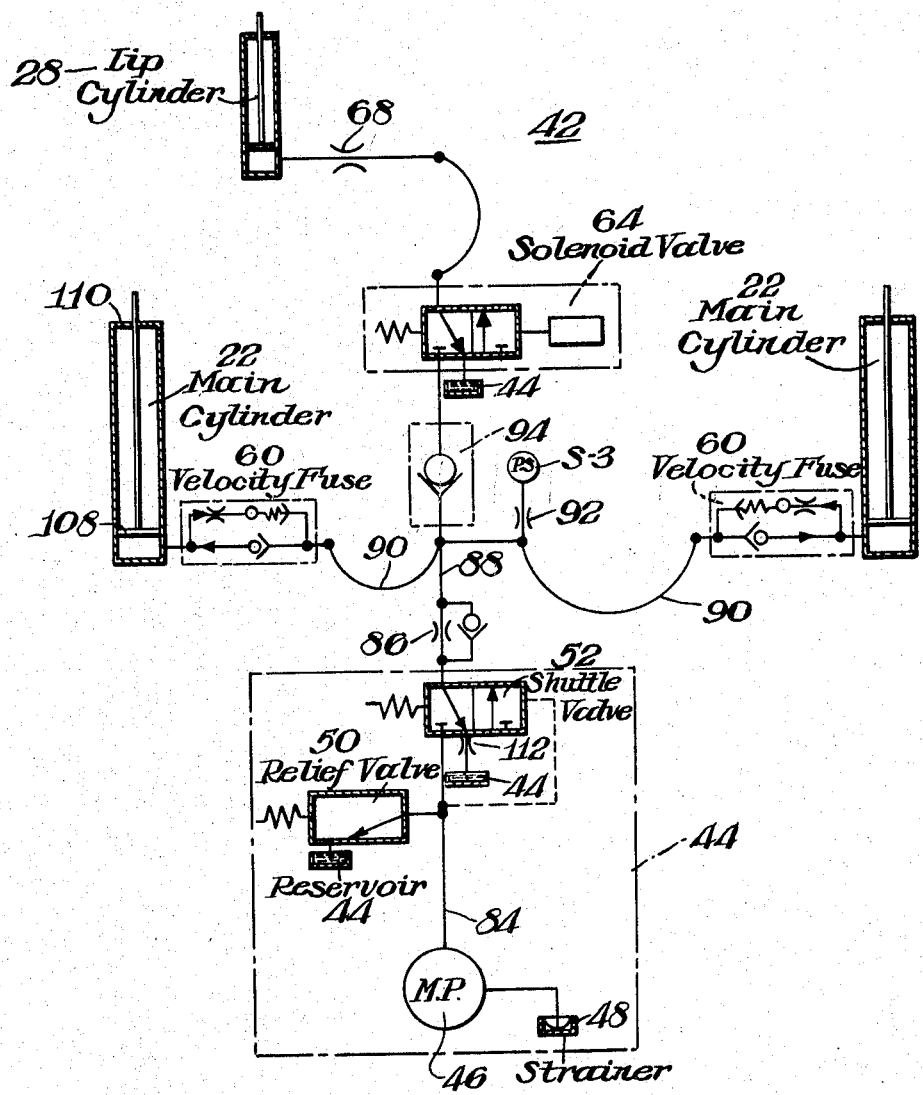
FIG. 6 is a schematic diagram of the hydraulic system of the ramp shown in FIGS. 1-4.

FIG. 8 is a view similar to FIG. 7 showing the lip in full outline in a position adjacent the retracted vertical position and in phantom outline in a position adjacent the horizontal bridging position in conjunction with the embodiment of this invention shown in FIG. 7 and its operating diagram; and FIGS. 9-15 are schematic views in elevation showing operating positions of the ramp shown in FIGS. 1-6 and parts thereof throughout a normal cycle of operation.

In FIGS. 1-3 is shown a power-operated ramp 10 for bridging the space between a loading dock 12 and a vehicle bed 14 shown in FIGS. 9-13 parked adjacent to dock 12. Ramp 10 includes a platform 16 whose rear end 18 is connected to dock 12 by main hinge 20. A pair of main operating cylinders 22 react between loading dock 12 and platform 16 to provide powered elevating means for rotating platform 16 upwardly about main hinge 20. Lip 24 is connected to the front of platform 16 by lip hinge 26 for movement between the substantially vertical retracted position shown in FIG. 2 to a bridging position in which it forms a substantial continuation of platform 16 as shown in FIGS. 4, 11 and 12. A lip operating cylinder 28 reacts between platform 16 and lip 24 to provide a fluid-powered lip actuating means for raising lip 24 from the vertical retracted to the bridging position.

Ramp 10 is mounted within a rectangular pit 30 in the front of dock 12, and in the crossover position shown in FIGS. 1-3 upper deck 32 of platform 16 lies horizontally flush with the main upper surface 34 of loading dock 12 to permit traffic along the dock to freely cross over platform 16 from side to side. In this crossover condition lip 24 is retracted to a substantially vertical position with its tip 36 resting within crossover slot 38 at the front of pit 30. This causes lip 24 to help support the weight of platform 16 in the crossover position. Bumper blocks 40 are mounted on the front of loading dock 12 on both sides of ramp 10 to prevent an incoming vehicle from bumping into retracted lip 24.

Diagrams of mechanical, electrical and hydraulic operating aspects of ramp 10 are shown in FIGS. 4-6. FIG. 4 generally describes the physical disposition of operating aspects of ramp 10 and the parts that are operated. As previously described, platform 16 is raised and lowered through hydraulic operating cylinders 22, and lip 24 is raised and lowered through lip actuating hydraulic operating cylinder 28. Hydraulic system 42 (later fully described in conjunction with FIG. 6) includes reservoir 44 within which motorized pump 46 and strainer 48 are conveniently mounted. Pump 46 discharges through shuttle valve 52 and tube 54 to manifold block 56. Block 56 is connected to main operating cylinder 22 by tubes 58 within which velocity fuse 60 later described is inserted. Tube 62 connects manifold 56 with the supply side of solenoid valve 64 which is connected by tube 66 to lip operating cylinder 28. Restriction 68 in tube 66 controls the flow of hydraulic fluid to and from cylinder 28. The return side of solenoid valve 64 is connected through tube 70 to drain back into reservoir 44. Hydraulic system 42 is later fully described in conjunction with FIG. 6.

FIG. 4 shows the physical positions of various electrical components associated with ramp 10, which are also shown connected in circuit in FIG. 5. Switch S-1, reached through hole 72 in deck 32 of platform 16, is connected to junction box 74 for actuating starting and stopping of motorized pump 46. A remote switch S-4 is similarly connected for actuating the ramp from a remote position, such as upon a wall 76 adjacent loading dock 12. Junction box 74 is mounted under deck 32 of platform 16, and it also includes relays AR and CR later described in conjunction with FIG. 5. Junction box 74 is also connected to the electrical portions SV of solenoid valve 64, pressure detecting switch S-3, motorized pump 46 and lip-operated switch S-2.

FIG. 5 shows the circuit connections of the various electrical components. Main power lines 78 and 80 are connected to opposite sides of single phase 115-volt, 60-cycle power source 82. Motorized pump 46 is connected between lines 78 and 80 primarily through switch S-1 and optional wall switch S-4 through relay CR. Relay CR closes contact CR-1 to energize holding relay AR that closes its contact AR-1 to maintain solenoid SV in solenoid vale 64 energized as long as the pressure detected by pressure switch S-3 is above the predetermined operating minimum of 50 p.s.i. as later discussed in detail. Lip-operating switch S-2 is connected to energize motorized pump 46 without energizing relay CR. Pressurized fluid can then only be directed to main operating cylinders 22 to raise platform 16, and solenoid valve 64 cannot be energized to raise lip 24 because holding relay AR cannot be energized while contact CR-1 remains open. This makes it impossible for lip 24 to be raised unless one of main operating switches S-1 or S-4 is depressed. This pertains even if a substantial load remains on platform 16 that builds up a pressure in hydraulic system 42 over the peak pressure of 500 p.s.i. that operates pressure switch S-3 at the upper end of its operating differential.

FIG. 6 shows the complete hydraulic system 42. The lines of connection are diagrammatic and therefore cannot exactly correlate with the physical tubes shown in FIG. 4. They are therefore differently numbered. Motorized pump 46 is connected through line 84 to shuttle valve 52. Relief valve 50 bypasses to reservoir 44 whenever relief system pressure, for example slightly above 500 p.s.i., is exceeded. Shuttle valve 52 is automatically actuated by pressure in line 84 to close the connection to drain and to pump straight through to the operating system shown above it. It is shown in FIG. 6 in the drain condition. Combination orifice and check valve 86 is connected in line 88 to allow full flow from the pump to the system and only a restricted rate of draining back to reservoir 44. Flexible lines 90 connect the main pressure to main operating cylinders 22 which raise platform 16. Velocity fuses 60 are connected within lines 90 to allow a full flow of pressure to operate cylinder and piston assembly 22 and a restricted flow backwardly to drain through restriction 86 and shuttle valve 52 up to a certain maximum velocity. Velocity fuses 60 are for example of the type described in U.S. Patent 2,821,209 in which the fuses jam shut if the rate of flow back through them exceeds a predetermined maximum rate. This jamming or locking of the fuses is caused if a weight is left on the platform sufficient to cause it to drop at an excessive speed when it is left unsupported. This might happen if a truck should pull out from under the platform as shown in FIG. 13 when a fork-lift truck remains on the platform.

Pressure switch S-3 is connected to system 42 at line 90 through orifice 92 which absorbs abrupt changes in pressure. Pressure switch S-3 is connected as shown in FIG. 5 to energize solenoid valve 64 between upper and lower ends of its operating differential. The upper end of the operating differential is relief valve bypass setting that provides a peak system operating pressure that indicates that platform 16 is fully raised, such as 500 p.s.i. The lower end of the operating differential of switch S-3 is that which indicates that platform 16 is externally supported, such as 50 p.s.i. The characteristics of the operating differential are later described in detail.

Either of main operating switches S-1 or S-4 energizes the solenoid SV of valve 64 to shift it from the draining position shown in FIG. 6 to the straight through pressure connection that supplies pressure to lip cylinder 28 through check valve 94 and restriction 68. Restriction 68 prevents lip 28 from dropping too fast when it is draining to reservoir 44.

FIGS. 7 and 8 show various operating positions of lip 24 from the bridging position A to substantially vertical retracted crossover position D. Inbetween these positions are shown lip positions B and C slightly displaced from the bridging and vertical.

Lip-operated switch S-2 is also shown in FIGS. 7 and 8 together with lip operating cylinder 28. The upper surface 96 of cylinder 28 is associated with actuating stem of switch S-2 in a manner that actuates switch S-2 only when it is displaced from the bridging position A or vertical retracted position D. FIG. 7 accordingly shows that switch S-2 has an operating cycle extending through lines of action $a$, $b$, $c$ and $d$. The letters designating the lines of action correspond in lower case to the positions A, B, C and D. Switch S-2 is energized only through the angle between lines of action $b$ and $c$ and otherwise it is off. FIG. 7 therefore illustrates that switch S-2 is "open" or "off" when lip 24 is in both positions A and D. In these positions upper surface 96 operating cylinder 28 operatively contacts stem 98. The same relative positions of cylinder 28 and stem 98 are obtained at positions A and B thereby eliminating any necessity for a complex linkage to maintain switch S-2 in the "off" position in either of the extremities of travel of lip 24. This is achieved by arranging linkage 100 from lip operating cylinder 28 to lip 24 about hinge 26 to cause cylinder 28 to assume substantially the same angle of inclination relative to platform 16 in both of lip positions A and D. This is achieved by proper adjustment of operating linkage 100 including pivoted connection 102, piston rod 104 and lip extension 106.

FIG. 8 shows positions B and C of lip 24 corresponding to switch lines of action $b$ and $c$ in which contact of switch S-2 operating stem 98 is just missed by upper surface 96 of cylinder 28. In positions B and C and all positions between them, lip-operated switch S-2 is maintained energized to actuate the raising of platform 16 as later described in detail.

*Operation*

FIGS. 9-15 show various phases of operation of ramp 10, its platform 16 and lip 24. FIG. 9 corresponds to FIG. 2 and shows the horizontal crossover position of ramp 10 in which deck 32 of platform 16 supports crossover traffic along upper surface 34 of loading dock 12 with the ramp 10 supported by engagement of tip 36 of lip 24 in crossover slot 38. At the righthand side of FIG. 9 is schematically shown in the bed of a truck 14 moving toward loading dock 12.

When truck 14 is backed adjacent ramp 10 as shown in FIG. 10, ramp 10 is raised to engage it with truck 14 by depressing either of pushbutton switches S-1 or S-4. This starts motorized pump 46 and shifts shuttle valve 52 to direct pressurized fluid to main ramp raising cylinders 22. This raises platform 16 to a predetermined upward inclination shown in FIG. 10 above the vehicle bed. When platform 16 is raised to this predetermined upward inclination against a restraining means (provided by the contact of piston 108 against the upper end 110 of cylinders 22 as shown in FIG. 6), the pressure in system 42 rises to the pump bypass setting of slightly above 500 p.s.i. This is the upper end of the operating differential of pressure switch S-3 which energizes solenoid portion SV of valve 64 through holding relay AR-1 and thereby directs pressure to lip operating cylinder 28. This raises lip 24 to the bridging position shown in FIG. 11. Check valve 94 then maintains lip operating cylinder 28 pressurized to hold it in the bridging position as long as solenoid valve 64 is maintained shifted by actuating of switch S-3. To drop ramp 10 to engage vehicle 14, the actuated one of pump motor operating switches S-1 and S-4 is released to stop the pump. Shuttle valve 52 then shifts to the drain position to cause the platform to drop at a controlled rate of speed governed by restriction 86 in line 88.

Once that pressure switch S-3 has been actuated at the peak operating pressure of 500 p.s.i., it is maintained actuated until a predetermined lower pressure, for example 50 p.s.i., occurs in system 42. This wide operating differential is employed to associate the controlled sustaining of the lip actuating device with the lowering phase of the ramp. As platform 16 lowers, a pressure in system 42 is maintained even though main operating cylinders 22 are draining to reservoir 44 because of the restriction or orifice 86. Orifice 86 maintains a pressure in system 42 above the predetermined lower switch-operating pressure as long as platform 16 is not externally supported. After platform 16 becomes externally supported by dropping on the bed of a truck 14 or reaching its lower limit of travel, the pressure in system 42 drops below 50 p.s.i. the lower end of the operating differential to which switch S-3 is set. This opens the circuit to solenoid SV of valve 64 to shift valve 64 back to the condition shown in FIG. 6 in which lip operating cylinder 28 is connected to drain to reservoir 44 through orifice 68. This automatically conditions lip 24 to drop to the substantially vertically retracted position after ramp 10 and its lip 24 engage the bed of truck 14 as shown in FIG. 12.

The particularly recited operating pressures at the upper and lower ends of the operating differential of pressure switch S-3 are purely illustrative. The upper end of the differential is correlated and responsive to platform position in that the peak pressure detected is obtained when cylinders 22 top out to cause the pressure in system 42 to approach pump bypass setting, which is for example slightly above 500 p.s.i. The lower end of the operating differential is associated with the lowering phase of the ramp and is some convenient minimum pressure obtained in system 42 that occurs when ramp 10 becomes externally supported. Pressure switch S-3 with a broad operating differential therefore provides a number of control functions. It is a platform position responsive means. It is a sustaining means throughout its operating differential in which the lip operating means is actuated while the ramp is above an external support, and it is a lowering phase associated means in the control device connected to the sustaining means for inactivating it when the ramp is externally supported to condition the lip for dropping to the vertically retracted position after the lowering phase of the ramp is completed. Pressure switch S-3 is advantageously a convenient means for dependably performing these functions as well as being directly correlated to the functions and phases involved.

In FIG. 13, truck 14 is driving out from under lip 24 which immediately starts to drop because of its aforementioned conditioning. As soon as lip 24 drops to positions between B and C (shown in FIGS. 7 and 8) switch S-2 is actuated by withdrawal of surface 96 of cylinder 28 from stem 98 as shown in FIG. 8 to turn motorized pump 46 on and start raising platform 16 as shown by corresponding arrows. The inactivation of main switches S-1 and S-4 prevents holding relay AR from being energized thereby causing lip 24 to drop as rapidly as permitted by orifice 68 to the vertical retracted position shown in FIG. 15 in which it will drop into crossover slot 38 to return ramp 10 to the crossover supported position.

FIG. 14 shows a remotely possible condition in which platform 16 drops so fast that lip 24 cannot drop to a position above crossover slot 38 in time to have its tip 36 fall into it. Lip 24 will then be in an "on" phase as shown in FIGS. 7 and 8, and motorized pump 46 will be operated until platform 16 is raised a sufficient distance to permit lip 24 to drop freely above and into crossover slot 38. In actual practice, the position shown in FIG. 14 is unlikely to occur because platform 16 is usually raised far enough to restore lip 24 by actuation of motorized pump 46 during normal fall of lip 24.

Ramp 10 must always return to the crossover position whenever it is not externally supported upon a truck. Lip 24 cannot be left in the extended position because it is conditioned for dropping by its positive association with the lowering phase of the ramp, and lip-operated switch S-2 raises ramp 16 sufficiently to restore lip 24 to the crossover slot. The ramp and lip operating arrangement herein described are described and claimed in copending and commonly assigned U.S. patent application, S.N. 411,888, filed November 17, 1964. This ramp also has other advantageous features. There is very little possibility of damage by jamming. If lip 24 should contact a truck body as the ramp rises, the fluid power system resiliently yields therefore avoiding permanent damage that a mechanically operated lip might incur. Velocity fuses 60 prevent platform 16 from dropping at an excessive rate of speed, such as might occur when truck 14 drives out from under it when a fork lift truck remains on platform 16. In that event the fuses will jam and lock the platform until the excess weight is removed.

What is claimed is:

1. A lip-operated switching device for a power operated ramp for bridging the space between a loading dock and a vehicle bed adjacent to it comprising a platform, main hinge means connecting the rear of said platform to said loading dock, powered elevating means connected to react between said loading dock and said platform for rotating it upwardly about said main hinge means, a lip disposed at the front of said platform, lip hinge means rotatably connecting said lip to the front of said platform for movement between a substantially vertical retracted position to a bridging position in which it forms a substantial continuation of said platform, lip operating cylinder means connected to react between the bottom of said platform and said lip for raising said lip from said retracted to said bridging position, an electrical switch mounted under said platform, said switch having an operating stem disposed toward said operating cylinder, a stem contacting surface upon said cylinder, said operating cylinder being rotatably connected to said platform and a portion of said lip for rotating said lip about said lip hinge means, said cylinder inclining away from and toward said platform as it rotates said lip, said cylinder and its mode of connection to said lip being arranged to cause said cylinder to assume substantially the same angle relative to said platform when said lip is in said substantially vertical retracted position and in said bridging position whereby said stem contacting surface is in the same phase of operation relative to said stem in both of said positions, and said cylinder assuming a different angle relative to said platform when said lip is in between said substantially vertical retracted position and said bridging position for disposing said switch contacting surface in a different operating phase relative to said stem whereby said switch is energized only when said cylinder is disposed in positions in between said retracted and bridging positions of said lip.

2. A device as set forth in claim 1 wherein said cylinder and mode of connection to said lip are arranged to dispose said cylinder in its position closest to said stem when said lip is disposed in its retracted and bridging positions.

3. A device as set forth in claim 2 wherein said lip contacting surface upon said cylinder is said outer surface of said cylinder that is disposed adjacent said platform.

4. A device as set forth in claim 3 wherein said lip operating cylinder includes a rod extending from it, a projection extending from said lip, said projection being disposed substantially perpendicularly to the main load carrying section of said lip and displaced from said lip hinge means, and pivot means rotatably connecting the end of said rod to said projection in a manner that disposes said cylinder and rod in substantially the same and closest angle relative to said platform as said rod moves in and out of said cylinder and said pivot means rotates about said hinge means when said lip is in said retracted and said bridging positions.

References Cited by the Examiner
UNITED STATES PATENTS

| 2,644,971 | 7/1953 | Rowe | 14—71 |
| 2,714,735 | 8/1955 | Watson | 14—71 |

JACOB L. NACKENOFF, *Primary Examiner.*